United States Patent [19]

Ebner

[11] 3,967,012

[45] June 29, 1976

[54] METHOD OF MAKING A SEALING AND INSULATING COATING

[75] Inventor: Jakob Ebner, Regensburg, Germany

[73] Assignee: Gundermann GmbH & Co. KG, Regensburg, Germany

[22] Filed: Apr. 1, 1974

[21] Appl. No.: 457,129

Related U.S. Application Data

[63] Continuation of Ser. No. 216,823, Jan. 10, 1972, abandoned.

[52] U.S. Cl. .................. 427/380; 260/29.6 ME; 260/29.7 E; 427/379; 428/446; 428/451; 428/462; 428/465
[51] Int. Cl.² .................. B05D 3/02; B32B 25/00
[58] Field of Search .......... 117/DIG. 3, 163, 168, 117/161 UH, 161 KP, 161 UB, 161 UT, 133, 135, 132 C, 132 CB, 123 D, 123 E; 260/29.7 E, 29.7 NR, 29.7 D, 29.6 ME, 29.6 RW, 29.6 NR, 28, 28.5; 427/385, 380, 379; 428/446, 451, 462, 465

[56] References Cited
UNITED STATES PATENTS

| | | |
|---|---|---|
| 2,805,210 | 9/1957 | Stoner et al. .............. 260/29.7 E |
| 2,827,397 | 3/1958 | Affleck .................. 117/DIG. 3 |
| 3,006,872 | 10/1961 | Benedict et al. ............. 260/29.7 E |
| 3,034,944 | 5/1962 | Chipman ................ 427/207 UX |
| 3,171,822 | 3/1965 | Moore .................... 117/163 X |
| 3,281,258 | 10/1966 | Callahan .................. 117/163 X |
| 3,432,339 | 3/1969 | Howell et al. ............. 260/29.7 E |
| 3,437,611 | 4/1969 | Macklin ................. 260/29.7 E |
| 3,486,920 | 12/1969 | Sington ................... 117/163 X |
| 3,494,781 | 2/1970 | Knibbe et al. ............. 117/163 X |
| 3,667,998 | 6/1972 | Esser ..................... 117/DIG. 3 |
| 3,714,101 | 1/1973 | Knechtges et al. ........... 117/161 KP |

OTHER PUBLICATIONS

*The Condensed Chemical Dictionary*, 7th Ed., p. 769 (1966).

*Primary Examiner*—Harry J. Gwinnell
*Attorney, Agent, or Firm*—Karl F. Ross; Herbert Dubno

[57] ABSTRACT

A method of coating a body with a sealing, insulating and moisture-barrier layer in which a thermally coagulatable emulsion containing 60 to 75% filler and antiaging components, together with an ether thermal sensitizer and a rubber latex or bitumen is applied to the body and is heated thereon by infrared radiation, a heating fluid or a flame.

1 Claim, No Drawings

3,967,012

METHOD OF MAKING A SEALING AND INSULATING COATING

FIELD OF THE INVENTION

The present invention relates to the coating of surfaces with moisture barriers and thermal or acoustic insulation and, more particularly, to the in situ formation of an insulating barrier impenetrable to moisture or water under pressure and suitable for a variety of applications.

BACKGROUND OF THE INVENTION

The formation of insulating and moisture barriers in various fields has become increasingly important with the advent of synthetic-resin and like systems adapted to polymerize or two form a film in situ. For example, it is desirable to seal a concrete structure, e.g. a roof, platform, deck, floor or wall, against penetration of moisture and even against the penetration of water with a hydrostatic head. While laminating the surface with foils or slabs or other materials has proved to be effective in many cases, these methods are often prohibitively expensive. Efforts have been made to coat, by spraying or painting, the support surface of concrete, wood or other materials, with a layer of bituminous material or of a synthetic resin which, upon evaporation of the solvent under heat or with time, leaves a more or less continuous, flexible and impenetrable film providing a sealing action. It has been, however, difficult to use these techniques for providing sealing and insulating layers of some thickness or to use these techniques in the preparation of sealing layers designed to resist penetration of water under pressure. For example, culverts, spillways, sewage and stormdrain lines of concrete, settling tanks and the like, as well as subterranean structures such as foundations, tunnels and shafts, are often under a hydrostatic head so that the water penetrating a concrete, masonry or natural-rock wall exudes from the latter under pressure. Typical coatings of the type described, applied in the manner set forth, are incapable of withstanding the hydrostatic pressure and do not bond to the support surface with sufficient tenacity so as to be successful. Furthermore, such conventional coating systems require careful cleaning and drying of the surface to which they are applied, are relatively expensive and often have different sealing and insulating characteristics depending upon the conditions under which they are applied.

It has been proposed heretofore to provide sealing layers or coatings from a resinous emulsion by incorporating in the layer, at least on the support surface, a precipitating agent which induces coagulation, polymerization and film formation when the precipitating agent and the emulsion are brought together. The precipitating agent may be mixed with the emulsion upon the surface (e.g. using double-spray nozzles), may be added after the emulsion has been spread upon the support surface, or may be applied to the support surface before the emulsion contacts the same. The emulsion solids coagulate rapidly in the presence of the precipitating agents and are applied by spraying, fogging or pouring on the support surface. Typical precipitating agents are inorganic or organic metal salts including zinc acetate, calcium nitrate, calcium chloride or aluminum sulfate. It is also known to provide a bituminous emulsion in which a bitumen or asphaltic component is incorporated in, or incorporates, a natural or synthetic rubber latex. Here again a precipitating agent is used and is mixed with the emulsion upon the substrate. In this case, the precipitatng agents can be weakly acidic solutions or solutions of various mineral salts, e.g. calcium chloride.

While these earlier techniques may be used to deposit relatively thick layers upon a substrate for sealing them against moisture and providing thermal or electrical or acoustic insulation, difficulties are encountered because of the corrosivity of the metal salts of the layer and the fact that fluorides, sulfates and the like are detrimental to the strength of concrete. In other words, the application of conventional layers to concrete, steel-containing and related substrates is accompanied by deterioration of the substrate. It should also be noted that the conventional sealing systems are characterized by retention of moisture for long periods, a phenomenon which is detrimental to adhesion.

OBJECTS OF THE INVENTION

It is the principal object of the present invention to provide an improved method of making a sealing and insulating layer for the purpose described.

Another object of the invention is to provide a process for depositing an insulating and/or sealing layer, capable of resisting the diffusion of moisture as well as hydrostatic pressures, which has greater adhesion to the substrate than heretofore and can be provided in a relatively thick layer.

SUMMARY OF THE INVENTION

These objects and others which will become apparent hereinafter are attained by providing a sealing and insulating composition, adapted to form a continuous coherent and adhesive layer which can be fully dried in a short period of time and can serve as a barrier to moisture and even water under pressure while acting as an insulating layer, by incorporating within the composition one or more thermal sensitizers for a polymeric material contained in the emulsion which is capable of precipitating upon wuch thermal activation a coagulated dense and continuous deposit. According to the present invention, therefore, heat energy serves as the precipitating agent and induces coagulation and polymerization together with precipitation and layer formation. Under normal conditions, the emulsion or solution of polymeric materials and bituminous compounds, fillers, antioxidants and antiaging compounds is a dispersion or suspension which is more or less stable under heat. Of course, it is possible to cause a dry deposit to form simply by heating the layer sufficiently to dry off the moisture, but I prefer to incorporate into the composition a thermal activator, i.e. one which upon heating will induce coagulation, precipitation and layer formation even before any significant evaporation of moisture has occured. It is to be understood, therefore, that the term "thermal activation" as used herein is intended to refer to the inclusion in the composition of a substance so sensitive to heat as to operate prior to significant evaporation of water to induce precipitation. The composition thus coagulates spontaneously upon the application of heat, the temperature at which activation occurs being a function of the particular thermal sensitizers.

It should be noted that thermal sensitizers of the type intended for use with the present invention will normally remain in solution or suspension and will not induce coagulation of the polymeric and/or bituminous substances therein. Suitable thermal sensitizers are polyvinylmethylethers and polyglycol ethers including polyethyleneglycolethers which in cold water are soluble but, when thermally activated, polymerize until they reach their cloud point at which time they induce coagulation and precipitation from solution. The thermal sensitizers entrain polymeric materials of the latex and bituminous particles therealong.

According to the present invention, the emulsion consists of the aqueous suspension or dispersion of a primary coating substance selected from the group which consists of bitumens, asphalts and tars and moisture-resistant natural or synthetic rubbers or synthetic-resin particles. The primary coating substances may include one or more of the mentioned classes of compound and I may, for example, provide a polymethyl methacrylate latex in which particles of polystyrene or a prepolymer of the urethane type are dispersed together with bitumen particles and/or a natural rubber or a synthetic (ABS) type rubber. In this case, the emulsion may contain 40% by weight solids in which all of the components are present in an equal proportion by weight. When the emulsion is a bituminous or tar emulsion containing the thermal sensitizers, I may add natural or synthetic rubber latex and/or synthetic-resin dispersions thereto. In addition, the composition may include inorganic fillers such as asbestos fibers, shale meal, expanded minerals such as expanded shale, perlite and slag, or pulverized glasses and the like. The thermal activation according to the invention may be carried out by radiant heating, convective heating, conductive heating, e.g. by infrared, hot air or flame sources. The layer thickness may range from 1 mm to several centimeters and the coating may be applied in one pass or in a plurality of passes. The coating is applicable to concrete, mineral and metallic substrates and does not attack metallic or concrete supports.

The process of the present invention can be carried out by heating the composition which may be doctored onto or applied as a paste or as applied by spray to the surface, the heating resulting in evaporation of the moisture after the layer is formed. Of course, at the conclusion of the process, the layer is substantially free from water. The additives, including fillers, radiation stabilizers, antioxidants and antiaging stabilizers may make up 60 to 75% of the composition. The lack of moisture in the layer has been found to be especially desirable for subterranean applications because any moisture is able to diffuse through the layer.

SPECIFIC EXAMPLE

To a styrene-butadiene rubber latex containing 40% solids, there are added equal quantities by weight of colloidal polystyrene, polyurethane and natural rubber latex so that all of the solids are present in equal parts by weight. The stabilizer is nonylphenoxypoly (ethyleneoxy) ethanol in an amount of 1% by weight of the emulsion to which water is added to maintain a 40% solids concentration. The emulsion is blended with 10% by weight of a mixture of equal parts of polyethyleneglycolether and polyvinylmethylether of a molecular weight such that these additives dissolve in the emulsion. During the blending process, in which the additives are solubilized, antiaging stabilizers of the phenyl-$\beta$ naphthylamine are added in an amount of 1.5% by weight. Equal parts by weight of asbestos meal, asbestos fibers and shale meal are then blended into the emulsion until these inorganic additives make up about 70% by weight of the composition. The resulting paste is applied to the concrete substrate and subjected to infrared heating. Before noticeable or material evaporation of water, a chemical transformation occurs in the mixture to produce a tough adherent layer whose adhesivity increases until the layer is thoroughly dry. The layer is resistant to moisture penetration and to penetration by water under a hydrostatic head of up to 15 feet and is effective for electrical thermal and acoustic insulation purposes.

I claim:

1. A process for applying an insulating, sealing and moisture-barrier coating to a solid concrete or metal body, comprising the steps of:

forming a thermally coagulatable emulsion composition of substantially equal parts by weight of a styrenebutadiene rubber latex, colloidal polystyrene, polyurethane and natural rubber latex, substantially 10% by weight of a mixture of substantially equal parts of polyethylene glycol ether and polyvinylmethylether as thermal sensitizers capable of coagulating said composition upon heating but not effecting coagulation in the absence of heating, a filler selected from the group which consists of asbestos fibers, asbestos meal and shale meal, and an antiaging stabilizer making up 60 to 75% of the composition and the composition having the consistency of a paste;

applying said composition in the form of a paste to said body;

heating said paste on said body to a temperature for a period sufficient to effect coagulation of the composition on said body without material evaporation of water therefrom, thereby forming a coherent layer; and thereafter heating said layer to dryness to effect a chemical transformation of said layer and produce a tough adherent layer whose adhesivity increases until said layer is thoroughly dry.

* * * * *